May 28, 1935.  A. WHITAKER  2,002,620

PHOTOGRAPHIC SOUND RECORD

Filed March 5, 1929

INVENTOR.
Alfred Whitaker,
BY J R Goldsborough
HIS ATTORNEY.

Patented May 28, 1935

2,002,620

UNITED STATES PATENT OFFICE 2,002,620

PHOTOGRAPHIC SOUND RECORD

Alfred Whitaker, West Drayton, England, assignor, by mesne assignments, to Radio Corporation of America, New York, N. Y., a corporation of Delaware Application March 5, 1929, Serial No. 344,556
In Great Britain March 19, 1928

8 Claims. (Cl. 274—41.6)

The present invention relates to the recording of sounds with the aid of light and more particularly to the reduction of "surface noise" in photographic sound records.

A part of the ground noise which is noticeable when reproducing a photographic sound record has been found to be due to local contraction of the gelatine in the neighbourhood of developed silver bromide grains which gives rise to irregularities in the gelatine surface, and consequently scatters the light by the irregular refraction introduced.

According to the present invention, the surface of a photographic sound record is rendered optically smooth in order to eliminate surface noise due to scattering at an imperfectly polished surface.

This may, for example, be accomplished in the case of a record on a photographic film either by polishing off the irregularities after the film is completed, or by flowing over the irregular surface of the film a material which hardens to a transparent solid having approximately the same refractive index as the gelatine, or other medium in which the sensitive material is suspended and in which the irregularities exist. For example, a further layer of gelatine may be applied, or a material giving superior resistance to abrasion, such as a cellulose ester varnish, may be employed. Alternatively, the surface of the film may be polished or buffed without the application of any new material. If desired, suitable waxes may be used in the polishing process and the surface is polished until it has a smooth and glossy appearance.

Figure 1:
Figure 2:
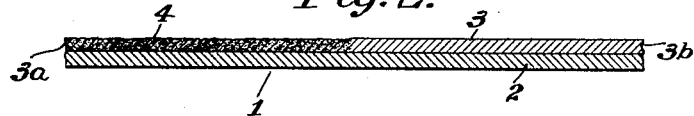
Figure 3:
Figure 4:

The novel features which I consider characteristic of my invention are set forth with particularity in the appended claims, the invention itself, however, together with additional objects and advantages thereof, being best understood from the following description of certain embodiments, when taken in connection with the accompanying drawing in which Figure 1 is a sectional view of undeveloped film showing the absence of any irregularities in the surface thereof, Fig. 2 is a sectional view of a developed film, only a portion of which has been exposed, showing the irregularities in the exposed surface thereof, Fig. 3 is a sectional view of the film of Fig. 2 after it has been treated in accordance with one method of my invention, and Fig. 4 is a sectional view of the film of Fig. 2 after it has been treated in accordance with another method of my invention.

Referring to the drawing, wherein similar reference characters indicate corresponding parts throughout, there is shown, in Fig. 1, a film 1 comprising a celluloid base or carrier 2 coated with a light sensitive emulsion 3, such as silver bromide. The coating 3, not having been exposed to light, remains unchanged from its original condition, and the gelatine thereof is smooth. Fig. 2 shows the film 1 after the portion 3a thereof has been exposed to the effects of light and the film developed, the portion 3b not having been subjected to the effects of light. The portion 3a has an uneven surface 4 of more or less reticulated form caused by contraction of the gelatine in the neighbourhood of the exposed and developed silver bromide grains, and when sound is reproduced therefrom, there is a noticeable amount of surface noise in evidence due to a scattering of the reproducing light beam by the reticulations 4.

In accordance with one form of my invention, illustrated in Fig. 3, I am able to materially reduce the surface noise by polishing the reticulated surface 4 of the portion 3a. The polishing may be, and preferably is, done mechanically, but regardless of the method of polishing employed the irregular surface 4 should be polished off to a smooth and glossy surface 4a. If desired, suitable waxes may be used in the polishing process. Light passed through the surface 4a, in reproducing sound, will not be subject to scattering, and the surface noise in the record will be considerably lessened.

In Fig. 4, I have shown another method of accomplishing the same result. Instead of polishing off the irregular surface 4, I apply a material thereon which hardens to a transparent solid 5 and which has the same index of refraction as the coating 3 in which the irregularities 4 exist. The material 5 may be flowed over the surface 4 and may comprise, for example, a further layer of gelatine similar to the coating 3, or it may comprise a material such as a cellulose ester varnish which has a relatively great resistance to abrasion. If desired, the surface of the material 5 may then also be polished, although this is not necessary.

While I have shown and described certain specific embodiments of my invention, I am fully aware that many modifications thereof are possible. My invention therefore, is not to be restricted except insofar as is necessitated by the prior art and by the spirit of the appended claims.

I claim:

1. The method of reducing the surface noise in a photographic sound record which consists in subjecting the surface of said record to a smoothing operation to render said surface optically smooth.

2. The method of reducing the surface noise in a photographic sound record which consists in applying to the irregular surface of said record a transparent material adapted to fill in the irregularities in the surface of said record.

3. The method of reducing the surface noise in a photographic sound record which consists in subjecting the irregular surface of said record to a polishing operation for the purpose of removing or reducing the irregularities.

4. A photographic sound record comprising a film having a developed sensitized surface and having applied thereto a smooth surface coating of a transparent material having substantially the same refractive index as the material of said sensitized surface.

5. A photographic sound record comprising a film having a developed irregular surface of sensitized gelatine and a smooth surface coating of gelatine applied thereto.

6. A photographic sound record comprising a film having a developed irregular surface of sensitized gelatine and a smooth surface coating of cellulose ester varnish applied thereto.

7. In the method of preparing a photographic sound record, the step which consists in optically smoothing the recorded surface thereof.

8. A photographic sound record comprising a developed film having an optically smooth surface.

ALFRED WHITAKER.